US009319127B2

(12) United States Patent
Kim et al.

(10) Patent No.: US 9,319,127 B2
(45) Date of Patent: Apr. 19, 2016

(54) METHOD OF RELAY BETWEEN DEVICES

(71) Applicant: Electronics and Telecommunications Research Institute, Daejeon (KR)

(72) Inventors: Eunkyung Kim, Daejeon (KR); Jae Sun Cha, Daejeon (KR); Jae Joon Park, Daejeon (KR); Hyun Lee, Daejeon (KR); Kwang Jae Lim, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/455,399

(22) Filed: Aug. 8, 2014

(65) Prior Publication Data
US 2015/0045033 A1    Feb. 12, 2015

(30) Foreign Application Priority Data

Aug. 9, 2013   (KR) .................. 10-2013-0094994
Sep. 27, 2013  (KR) .................. 10-2013-0115300
Aug. 8, 2014   (KR) .................. 10-2014-0102188

(51) Int. Cl.
*H04W 36/00* (2009.01)
*H04B 7/155* (2006.01)
*H04W 88/04* (2009.01)

(52) U.S. Cl.
CPC ........... *H04B 7/15507* (2013.01); *H04W 36/00* (2013.01); *H04W 88/04* (2013.01)

(58) Field of Classification Search
CPC .. H04B 7/15507; H04W 36/38; H04W 36/00; H04W 88/04

USPC ............ 455/436, 11.1, 434, 437, 509, 426.1, 455/404.2; 370/315, 312, 241, 329, 331
See application file for complete search history.

(56) References Cited

U.S. PATENT DOCUMENTS

| 8,190,083 | B2 | 5/2012 | Wu et al. | |
|---|---|---|---|---|
| 2011/0124312 | A1* | 5/2011 | Kwon et al. | ............... 455/404.2 |
| 2011/0319013 | A1* | 12/2011 | Jung et al. | .......................... 455/7 |
| 2012/0163252 | A1 | 6/2012 | Ahn et al. | |
| 2013/0244658 | A1* | 9/2013 | Tanaka et al. | ................. 455/436 |
| 2013/0331093 | A1* | 12/2013 | Cho et al. | ................... 455/426.1 |
| 2014/0192781 | A1* | 7/2014 | Teyeb et al. | ................... 370/331 |

(Continued)

FOREIGN PATENT DOCUMENTS

| KR | 10-2012-0074251 A | 5/2012 |
|---|---|---|
| KR | 10-2012-0062552 A | 6/2012 |

OTHER PUBLICATIONS

3GPP, "Discussion on Relaying for D2D Proximity Services", TSG-RAN WG2 Meeting #83, R2-132592, Aug. 9, 2013.

(Continued)

*Primary Examiner* — Dhaval Patel
(74) *Attorney, Agent, or Firm* — Rabin & Berdo, P.C.

(57) ABSTRACT

A data relay method includes receiving a relay request from a BS, and when the relay request is accepted, relaying data between the BS and at least one external terminal, or the data relay method includes determining relaying between a first terminal among a plurality of terminals, and other remaining terminals excluding the first terminal among the plurality of terminals, and relaying data between the first terminal and the other remaining terminals.

17 Claims, 6 Drawing Sheets

(56) References Cited

U.S. PATENT DOCUMENTS

2014/0301370 A1* 10/2014 Sivavakeesar ................ 370/331
2015/0036579 A1* 2/2015 Wu et al. ....................... 370/312

OTHER PUBLICATIONS

3GPP, "Discussion on ProSe-enabled UE functionality", TSG RAN WG2 Meeting #83bis, R2-133245, Sep. 27, 2013.

* cited by examiner

METHOD OF RELAY BETWEEN DEVICES

CROSS-REFERENCE TO RELATED APPLICATION

This application claims priority to and the benefit of Korean Patent Application Nos. 10-2013-0094994, 10-2013-0115300 and 10-2014-0102188 filed in the Korean Intellectual Property Office on Aug. 9, 2013, Sep. 27, 2013 and Aug. 8, 2014, the entire contents of which are incorporated herein by reference.

BACKGROUND OF THE INVENTION (a) Field of the Invention

The present invention relates to a method for relaying data between a base station and a terminal or between terminals.

(b) Description of the Related Art

In order to support proximity-based services in a wireless communication system, a method for establishing a direct link between terminals is under discussion in IEEE 802.11 (pre-association discovery, PAD), IEEE 802.15 (TG8, peer aware communication, PAC), IEEE 802.16 (GRIDMAN TG) and 3GPP (D2D proximity-based service, ProSe), and the like.

Recently, services have been provided through establishment of direct links between terminals as proximity-based services (LTE device to device proximity discovery) including public safety, disaster relief, non-public safety (or commercial), and the like.

In order to establish a direct link between terminals, each neighbor terminal determines a possibility of forming a direct link through searching. When formation of a direct link is possible, each terminal forms a direct link with a neighbor terminal to directly exchange data without the help (relaying) of a base station (BS). However, in a state in which a terminal establishes a direct link and exchanges data through the direct link, if the terminal moves, data exchange through the direct link may be impossible or efficiency may deteriorate.

In this case, the terminal may exchange data with the help of a BS or any other terminal. In a case in which one of two terminals connected through a direct link moves out of a service area of a BS, a terminal located within the service area of the BS may help the terminal outside the service area of the BS exchange data with a BS.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of enabling a terminal included in a service area of a base station (BS) to relay data between the BS and another terminal and enabling a terminal having direct links with at least two terminals to relay data transmission and reception between the terminals connected by the direct links.

According to an embodiment of the present invention, a data relay method enabling a terminal to relay data between a base station (BS) and at least one external terminal located outside of a service area of the BS is provided.

The data relay method may include: receiving a relay request from the BS; and when the relay request is accepted, relaying data between the BS and the at least one external terminal.

The relay request may be a request transmitted by the BS to the terminal determined based on relay terminal selection conditions.

The relay terminal selection conditions may include a condition regarding a remaining amount of power of a terminal connected to the BS.

The relay terminal selection conditions may include channel quality between a terminal and the BS and a condition regarding channel quality of a direct link between a terminal and an external terminal.

The relay terminal selection conditions may include a condition regarding a location of a terminal, relative to the BS.

The relay terminal selection conditions may include a condition regarding mobility of a terminal.

The data relay method may further include reporting relay capability of a terminal to the BS before receiving a relay request. The relaying may include delivering an intention of acceptance of the relay request, to the BS.

The relaying may include, when the relay request is not accepted, delivering an intention of rejection or an intention of reserved acceptance of the relay request, to the BS.

The relaying may include: searching for at least one external terminal and establishing a direct link with the at least one external terminal; and relaying data between the BS and the at least one external terminal.

The data relay method may further include: requesting handover with respect to the relay request from the BS; and handing over the relay role to a relay terminal newly selected by the BS.

The data relay method may further include: receiving instruction to hand over the relay role to the relay terminal newly selected by the BS, from the BS; and handing over the relay role to the relay terminal.

The data relay method may further include managing a list of at least one external terminal.

The data may include information regarding a destination terminal.

Another embodiment of the present invention provides a data relay method enabling a relay terminal to relay data between a plurality of terminals. The data relay method may include: determining relaying between a first terminal among the plurality of terminals, and other remaining terminals excluding the first terminal among the plurality of terminals; and relaying data between the first terminal and the other remaining terminals.

The determining may include receiving a relay request with respect to data from the first terminal.

The determining may include receiving a relay request with respect to data from a second terminal among the remaining terminals.

The data relay method may further include: after a new terminal establishes a direct link with the first terminal, receiving, by the first terminal, a handover instruction with respect to relay transmitted from the first terminal; and handing over the relay role to the new terminal.

The data rely method may further include: requesting the first terminal to hand over the relay role; and handing over, by the first terminal, the relay role to the selected new terminal.

DETAILED DESCRIPTION OF THE EMBODIMENTS

Figure 1:
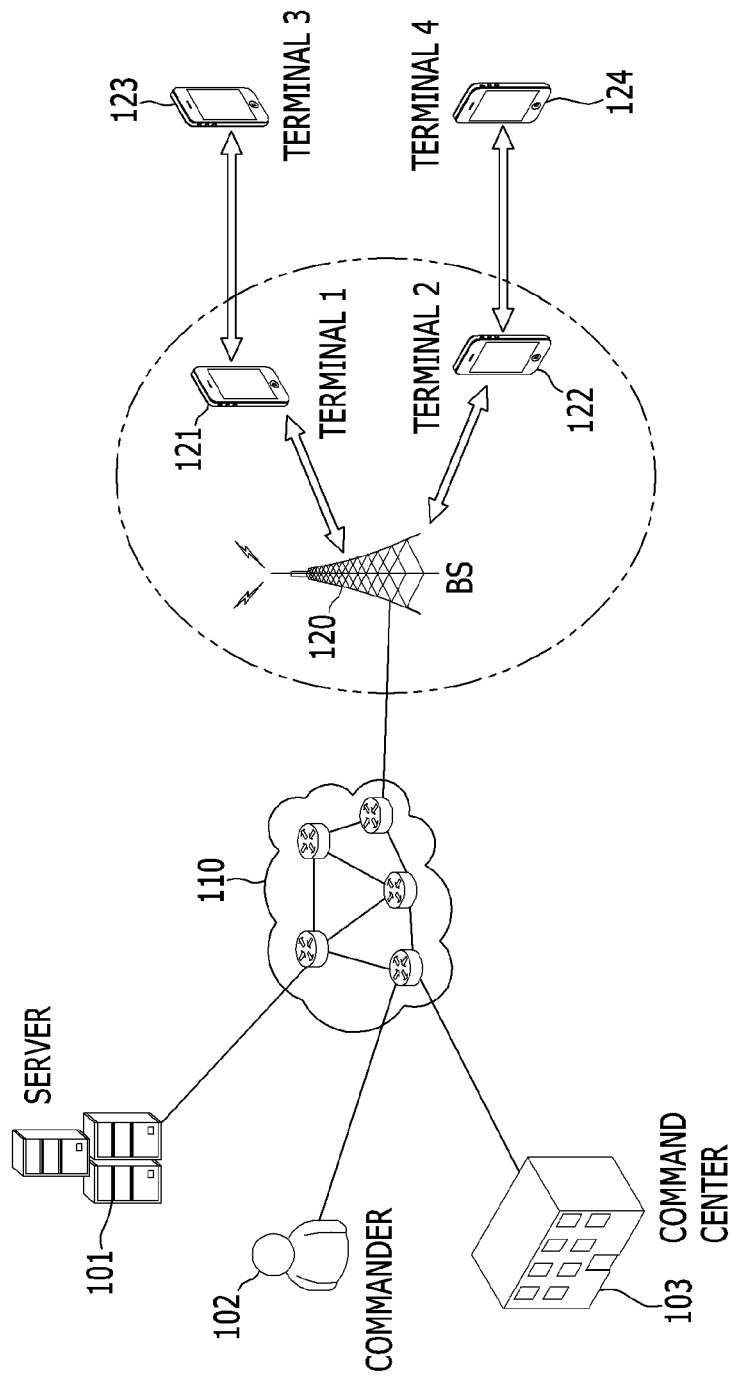
FIG. 1 is a view illustrating direct links between terminals according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), user equipment (UE), a device, or the like, and may include an entirety or a portion of functions of the MT, the MS, the AMS, the HR-MS, the SS, the PSS, the AT, the UE, the device, or the like.

Also, a base station (BS) may refer to an advanced base station (ABS), a high reliability base station (HR-BS), a node B (nodeB), an evolved node B (eNodeB), an access point (AP), a radio access station (RAS), a base transceiver station (BTS), a mobile multihop relay (MMR)-BS, a relay station (RS) serving as a BS, an HR-RS serving as a BS, or the like, and may include the entirety or a portion of functions of the ABS, the node B, the eNodeB, the AP, the RAS, the BTS, the MMR-BS, the RS, the HR-RS, or the like.

In addition, unless explicitly described to the contrary, the word "comprise" and variations such as "comprises" or "comprising" will be understood to imply the inclusion of stated elements but not the exclusion of any other elements.

FIG. 1 is a view illustrating direct links between terminals according to an exemplary embodiment of the present invention.

In FIG. 1, a terminal 1 121 and a terminal 2 122 are terminals relaying data exchange between a base station (BS) 120 and other terminals (terminal 3 and terminal 4) 123 and 124. Referring to FIG. 1, the BS 120 may be connected to a server 101, a commander 102, or a command center 103 through a network 110. In the present invention, the terminal 1 121 and the terminal 2 122 of FIG. 1 are type 1 terminals. That is, the type 1 terminals may relay data between the BS and another terminal.

Figure 2:
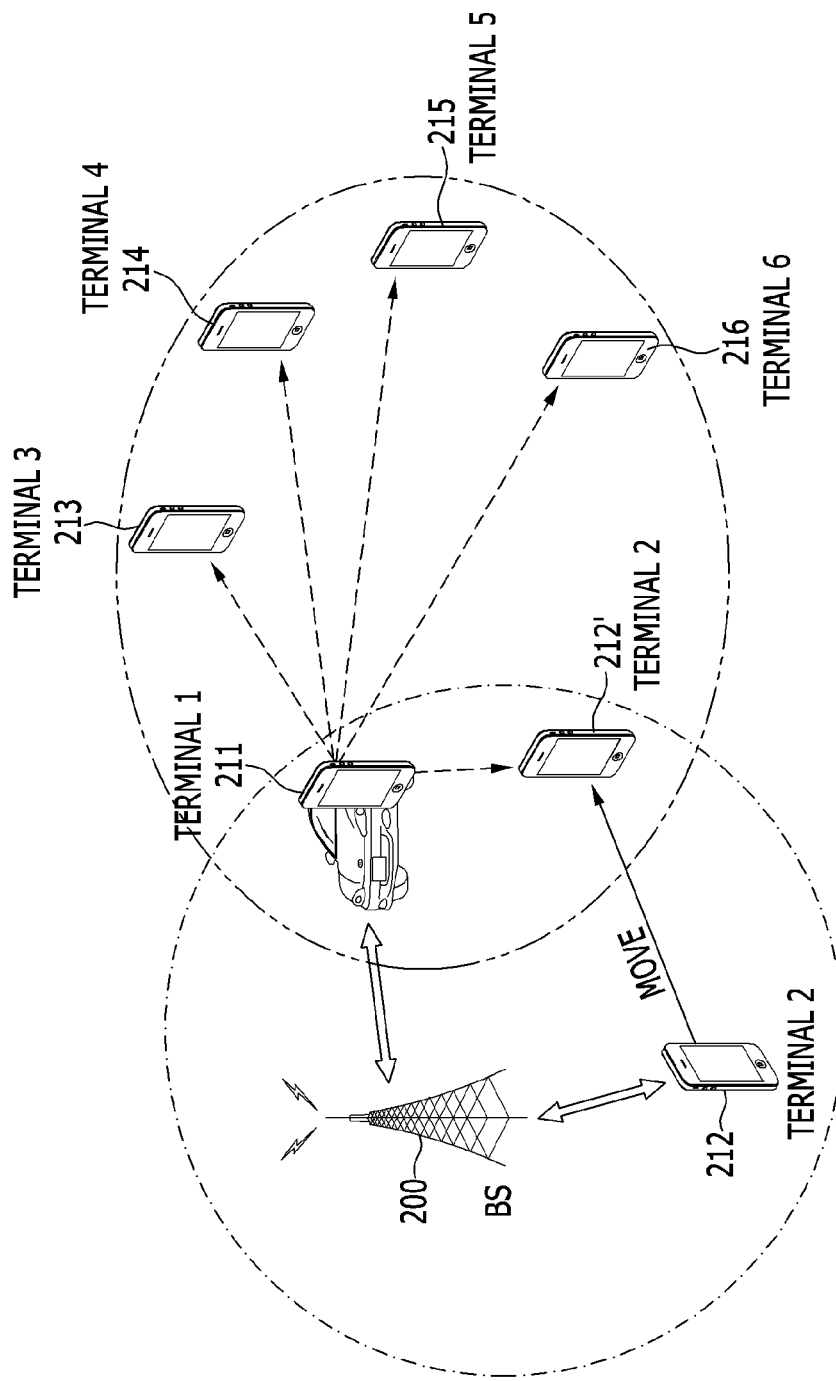
FIG. 2 is a view illustrating direct links between terminals according to another exemplary embodiment of the present invention.

FIG. 2 is a view illustrating direct links between terminals according to another exemplary embodiment of the present invention.

In FIG. 2, a terminal 1 211 relays data exchange between a BS 200 and a plurality of other terminals (terminal 2 to terminal 6) 212 to 216. Referring to FIG. 2, the terminal 2 212 that was initially connected to the BS 200 moved (212→212') to establish a direct link with the terminal 1 211. In the present invention, the terminal 1 211 of FIG. 2 is a type 2 terminal. That is, the type 2 terminal may relay data between the BS and the plurality of other terminals.

Figure 3:
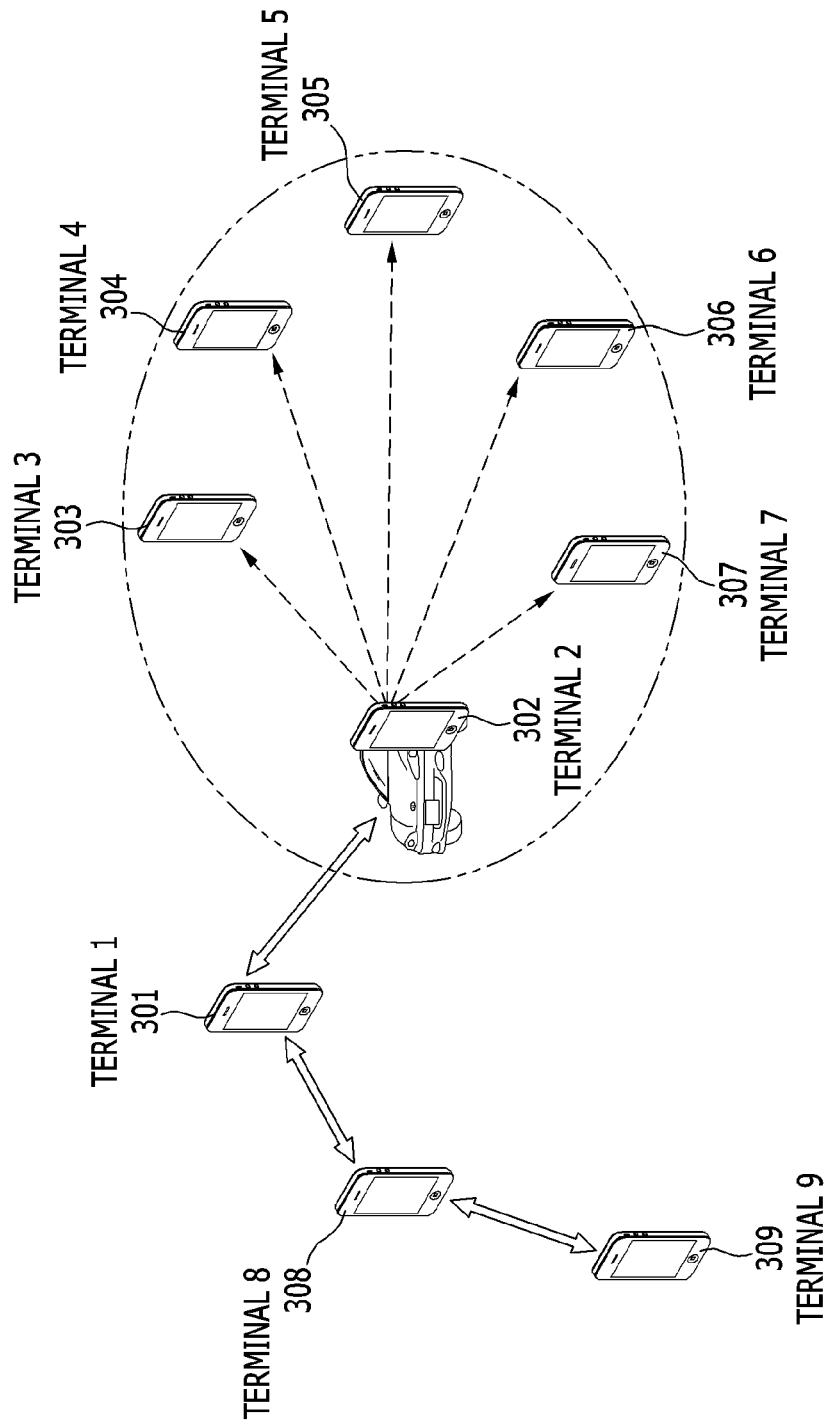
FIG. 3 is a view illustrating direct links between terminals according to another exemplary embodiment of the present invention.

FIG. 3 is a view illustrating direct links between terminals according to another exemplary embodiment of the present invention.

A terminal 8 308 relays data exchange between two terminals (terminal 1 and terminal 9) 301 and 309 exchanging data through a direct link. A terminal 2 302 of FIG. 3 may relay data between one terminal (terminal 1) 301 and a plurality of terminals (terminal 3 through terminal 7) 303 to 307. In the present invention, the terminal 8 308 of FIG. 3 may be type 3 terminal, and the terminal 2 302 of FIG. 3 may be a type 4 terminal. That is, in another exemplary embodiment of the present invention, the type 3 terminal may relay data between two terminals exchanging data through a direct link, and the type 4 terminal may relay data between one terminal and a plurality of terminals exchanging data through a direct link.

Figure 4:
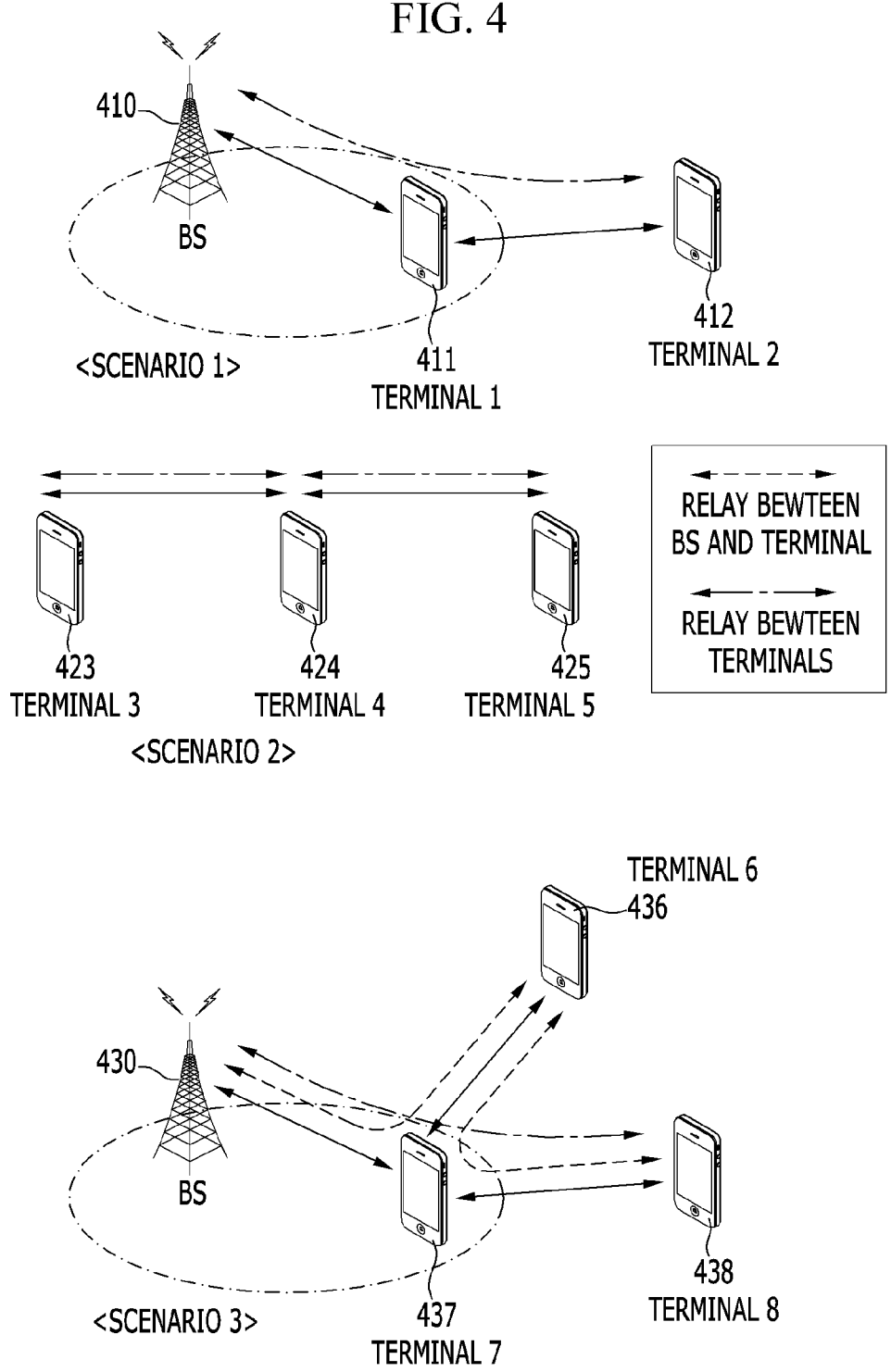
FIG. 4 is a view illustrating a data relay scenario of terminals according to an exemplary embodiment of the present invention.

FIG. 4 is a view illustrating a data relay scenario of terminals according to an exemplary embodiment of the present invention.

In an exemplary embodiment of the present invention, data may be relayed between a BS and a terminal or between terminals. Here, all the data transmitted and received between a BS and a terminal or between terminals may be relayed by a terminal that establishes an inter-terminal direct link and exchange data.

A scenario 1 describes a situation in which one terminal (terminal 1) 411 is located within the service area of a BS 410, the other terminal (terminal 2) 412 is located outside the service area of the BS 410, and the terminal 1 411 relays data between the BS 410 and the terminal 2 412.

A scenario 2 describes a situation in which all terminals are located outside a service area of a BS (including a case in which the BS is not involved although the terminals are located within the service area), and a terminal 4 424 relays data between two terminals (terminal 3 and terminal 5) 423 and 425.

A scenario 3 describes a situation in which a terminal 437 located within a service area of a BS 430 relays data between the BS 430 and terminals (terminal 6 and terminal 8) 436 and 438 located outside the service of the BS 430, and also relays data between the two terminals (terminal 6 and terminal 8) 436 and 438.

In an exemplary embodiment of the present invention, when a terminal relays data between a BS and a terminal or between terminals, conditions regarding selection and re-selection of a terminal serving as a relay terminal and a procedure for selecting and re-selecting a terminal serving as a relay terminal may be considered.

First, conditions regarding selection and re-selection of a relay terminal will be described.

A general terminal may be connected to a core network through connection with a BS and subsequently transmit and receive data. According to an exemplary embodiment of the present invention, in a case in which a particular terminal moves out of a service area of a BS so it cannot maintain data transmission and reception with the BS, a service with respect to the particular terminal may be continuously provided through relaying of another terminal. Also, even though connection between a particular terminal and a BS is maintained, if transmission efficiency can increase through data relay of another terminal, a terminal according to an exemplary embodiment of the present invention may relay data transmission and reception between the particular terminal and the BS or between the particular terminal and another particular terminal. Also, the terminal according to an exemplary embodiment of the present invention may relay data transmission and reception between the particular terminal and a plurality of terminals even when the particular terminal provides group communication for a plurality of neighboring terminals. In this case, when the particular terminal performs group communication with a plurality of terminals, even if a terminal included in the group moves out of the service area due to mobility, the present invention may be applied.

First, power of a terminal may be considered. In order for a terminal to relay data with limited power, power of the terminal is an important factor to be considered. In an exemplary embodiment of the present invention, a BS requests a terminal that may be able to serve as a relay (a terminal capable of relaying) to report the current remaining amount of electricity, and upon receiving the report request, the terminal reports a current remaining amount of electricity to the BS which has transmitted the report request. Thereafter, in consideration of the reported amount of electricity, the BS selects a relay terminal among terminals capable of relaying. Here, the BS may select a terminal having the largest remaining amount of electricity as a relay terminal. Alternatively, the BS may determine a magnitude of reference power in advance, and when a remaining amount of power of a particular terminal is greater than the reference power, the BS may determine that the particular terminal satisfies power conditions. Also, instead of reporting a remaining amount of electricity by a terminal, the terminal may transmit only information regarding whether a remaining amount of power thereof is greater than the reference power, and the BS may select a certain terminal among terminals having a greater remaining amount of power than the reference power based on the reported information. Further, when the currently remaining amount of electricity of the relay terminal is smaller than the reference power, the relay terminal may transmit corresponding information, that is, either 1) information indicating that the amount of power of the relay terminal has been reduced, relative to the reference power or 2) an amount of electricity, to the BS, to help the BS re-select a relay terminal.

In addition, quality of transmission and reception channels with the terminal serving as a relay terminal may be considered. When a particular terminal relays data, at least one of two or more links connected to the particular terminal is a direct link established between the particular terminal and other terminal. Thus, the BS according to an exemplary embodiment of the present invention may select a relay terminal in consideration of a channel status of the direct link between terminals. Here, the BS may select a terminal having the best channel status with respect to a terminal to be relayed, as a relay terminal. Alternatively, the BS may determine reference preference of a channel status in advance, and determine a terminal having a channel status equal to or greater than the reference preference, as a terminal satisfying a channel quality condition. To this end, the terminal may report channel quality information to the BS. In order to report the channel quality information, the terminal may use an existing channel quality information reporting method or may report the channel quality information upon receiving a request from the BS for data relay. Also, when quality of a channel status is degraded to be lower than the reference channel status, the relay terminal may transmit corresponding information, that is, either 1) a channel quality status lower than the reference channel status or 2) channel quality information, to the BS, to help the BS re-select a relay terminal.

Also, in selecting a relay terminal, a location of a terminal may be considered. In an embodiment of the present invention, in order to provide a service for a terminal located outside a service area of the BS, at least one terminal included in the service area may serve as a relay terminal. Since a channel status between the BS and a relay terminal and a channel status between a target terminal and the relay terminal may differ depending on a location of the relay terminal relative to the BS, a location of the relay terminal between the BS and the target terminal may need to be considered as an important factor in selecting a relay terminal.

Also, in selecting a relay terminal, mobility (or a movement speed) of a terminal may be taken into consideration. When a relay terminal moves, a channel status of a link is changed, and thus the BS may select a stationary terminal or a terminal with less mobility, as a relay terminal. To this end, the BS may need to determine mobility of a terminal. To determine this, a terminal may report its mobility (stage such as fast, regular, slow, or the like, or a specific speed) to the BS, or the BS may infer mobility of the terminal.

Meanwhile, among conditions (amount of power, channel status, mobility, or the like) for selecting a terminal for relaying data, one or more conditions may be combined to select or reselect a terminal for relaying data.

Also, the BS may designate a terminal appropriate for relay among a plurality of terminals located within a service area in advance and request the designated terminal to perform relaying. The terminal 1 of FIG. 2 or the terminal 2 of FIG. 3 may be designated as a relay terminal in advance.

Hereinafter, a procedure for selecting or re-selecting a terminal serving as a relay terminal will be described.

When the BS according to an embodiment of the present invention selects a relay terminal based on the foregoing conditions, the BS requests the terminal selected as a relay terminal to perform relaying.

Upon receiving the request for relaying from the BS, the terminal accepts the request, performs relaying, and delivers an intention of acceptance to the BS. Alternatively, the terminal may deliver an intention of non-acceptance (or reserved acceptance) of the request for relaying to the BS, without performing relaying.

Upon receiving the intention of acceptance from the relay terminal, the BS may search for inter-terminal device of the relay terminal and subsequently provide a service for a terminal outside the service area through data relay of the relay terminal. Here, the relay terminal may relay data to the terminal outside the service area through an already established direct link, or alternatively, the relay terminal may search for a terminal which is located outside the service area and requires data relay, establish a direct link with the searched terminal, and relay data to the terminal.

Figure 5:
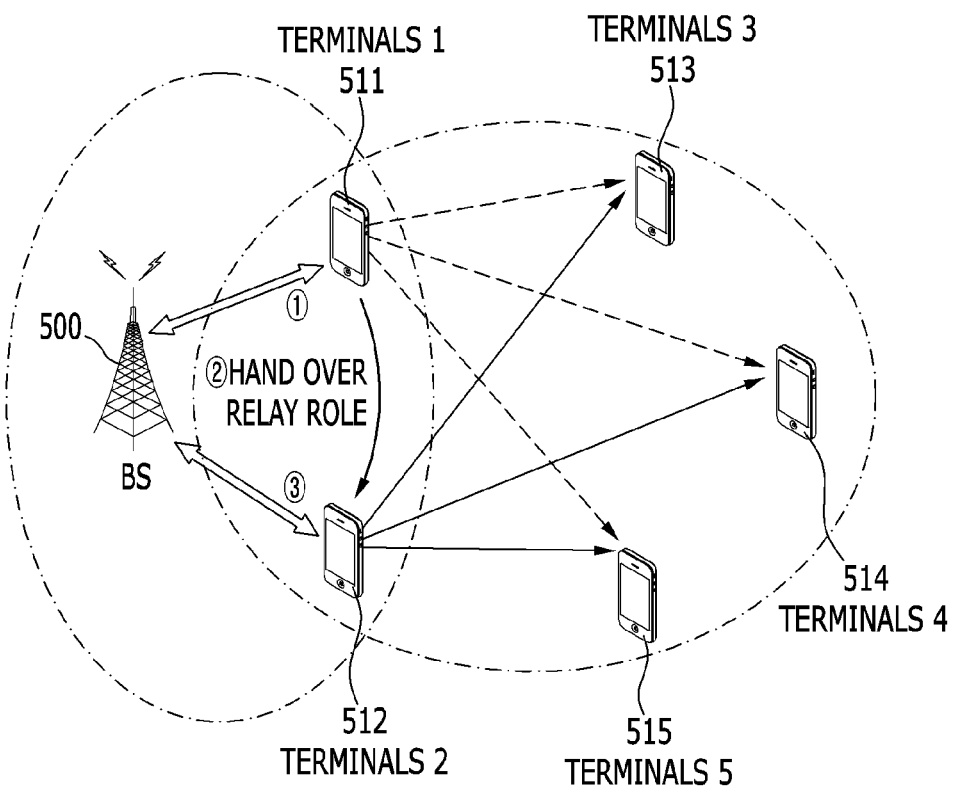
FIGS. 5 and 6 are views illustrating a procedure of handing over a relay role of a relay terminal according to an exemplary embodiment of the present invention.
Figure 6:
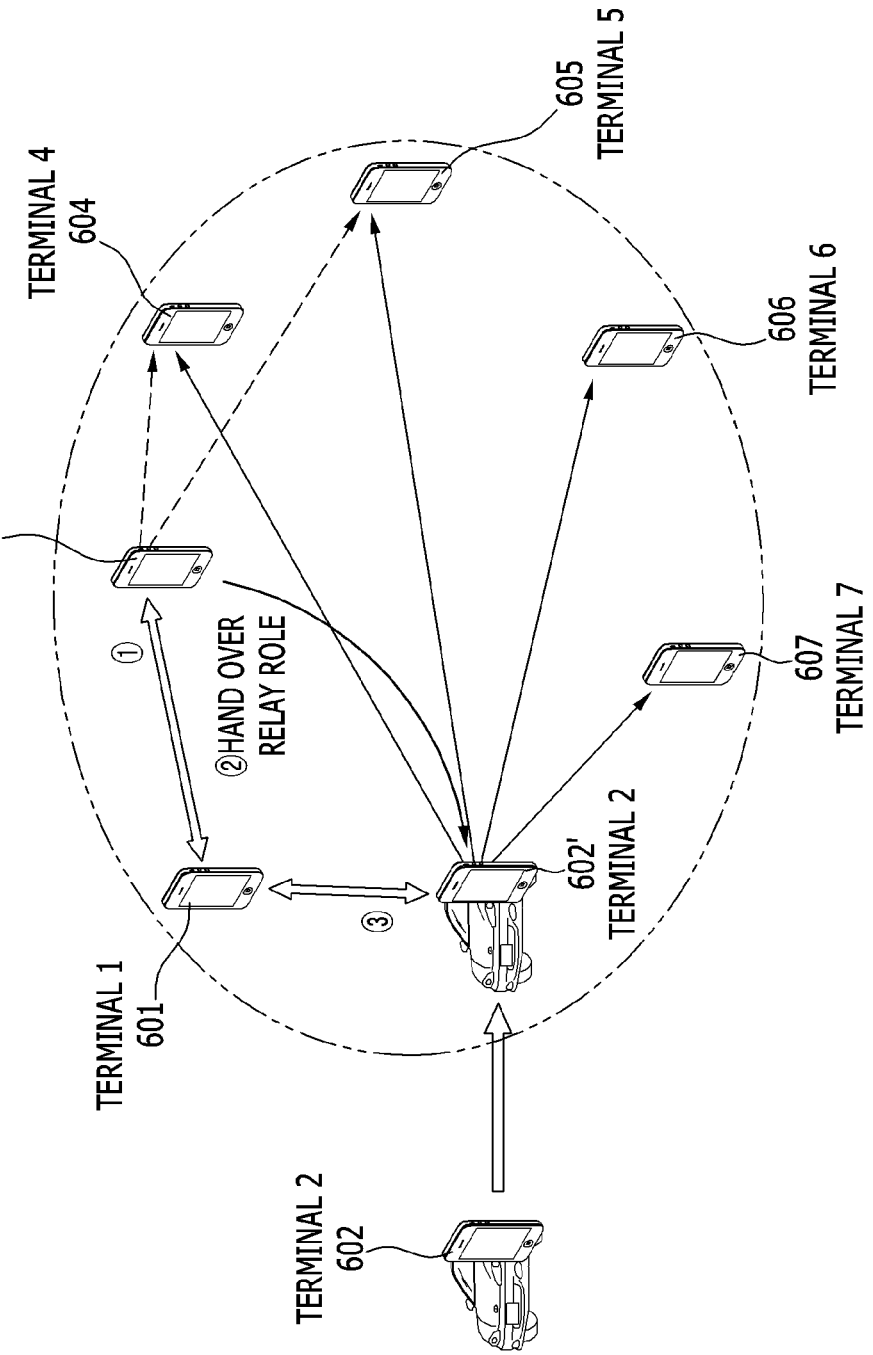

FIGS. 5 and 6 are views illustrating a procedure of handing over (or transferring) a relay role of a relay terminal according to an exemplary embodiment of the present invention.

Referring to FIG. 5, at the beginning, a terminal 1 511 is selected as a relay terminal by a BS 500, and relays data transmitted and received between a terminal 3 513, a terminal 4 514, and a terminal 5 515, and the BS 500. Thereafter, the terminal 1 511 may hand over the relay role to a terminal 2 512.

Here, the terminal 1 511, an existing relay terminal, may provide information required for relaying to the terminal 2 512, a new relay terminal. The handing the role of relaying over may be instructed by the BS 500 or may be requested by the terminal 1 511. The information required for relaying may include information related to at least one terminal to be provided with a service by the relay terminal. Thereafter, the terminal 2 512 serves as a new relay terminal and performs relaying between the BS 500 and terminal 3 513 to terminal 5 515.

Referring to FIG. 6, initially, a terminal 3 603 performs relaying between a terminal 1 601, a terminal 4 604, and a terminal 5 605. Thereafter, the terminal 2 602 (602→602') approaches the terminal 1 601 and the terminal 3 603 hands over its relay role to the terminal 2 602', the terminal 2 602' may become a new relay terminal and provide data or the like of the terminal 1 602 to terminal 4 604 to terminal 7 607.

In an exemplary embodiment of the present invention, a relay terminal may perform the following functions.

A relay terminal may transmit and receive data to and from a BS and exchange data with another terminal through a direct link.

When the relay terminal initially access a BS (attach or entry), the relay terminal may report relay capability thereof to the BS. Here, the terminal may classify capability type as relay capability between a BS and a terminal and relay capability between terminals, and report the same to the BS. The BS manages information regarding the relay capability reported from the terminal. When the terminal moves to another BS due to handover, or the like, the BS may deliver the relay capability information of the terminal to the other BS. In this case, the terminal may not report its relay capability to the other BS.

The relay terminal may manage a list of relayed terminals. When the relay terminal relays communication between the BS and a terminal, the relay terminal may manage a list of terminals that intend to communicate with the BS through relay. Meanwhile, when a certain terminal cannot directly communicate with the BS, the terminal may check whether there is a terminal capable of relaying within a service area of the BS through an inter-terminal direct link. When a terminal capable of relaying within a service area of the BS can be connected through a direct link, the terminal may request the terminal capable of relaying to perform relaying and the terminal capable of relaying may perform relaying between the BS and the terminal.

Meanwhile, in an embodiment of the present invention, the BS may transmit and receive data to and from the relay terminal, and may transmit and receive data to and from the terminal which is located outside the service area and connected through the relay terminal. In this case, when transmitting data, the BS may include even information regarding a destination of transmitted data, in data, and transmit the same. For example, the BS may include information regarding a destination of data in a media access control (MAC) header of data. Alternatively, the BS may classify transmission paths to distinguish a destination of data.

Also, even when data is transmitted and received using a direct link between terminals, information regarding a destination of data may be included in the data. When a source terminal transmits and receives data to and from a target terminal, the target terminal may become a terminal relaying data (relay terminal) or may be a final terminal that receives relayed data. Thus, in order to distinguish a destination of data between the relay terminal and the final terminal, the source terminal may include information regarding a destination of data in the data.

According to the embodiment of the present invention, a relay terminal may relay data between a BS and a terminal or between terminals, and in this case, the BS may select an optimal relay terminal in consideration of relay terminal selection conditions (mobility of a terminal, a location of a terminal, channel quality, a remaining amount of power of a terminal, and the like).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A data relay method enabling a terminal to relay data between a base station (BS) and at least one external terminal located outside of a service area of the BS, the method comprising:
   receiving a relay request from the BS;
   when the relay request is accepted, relaying data between the BS and the at least one external terminal;
   requesting handover with respect to the relay request from the BS; and
   handing over the relay role to a relay terminal newly selected by the BS.

2. The method of claim 1, wherein the relay request is a request transmitted by the BS to the terminal determined based on relay terminal selection conditions.

3. The method of claim 2, wherein the relay terminal selection conditions include a condition regarding a remaining amount of power of a terminal connected to the BS.

4. The method of claim 2, wherein the relay terminal selection conditions include channel quality between a terminal and the BS and a condition regarding channel quality of a direct link between a terminal and an external terminal.

5. The method of claim 2, wherein the relay terminal selection conditions include a condition regarding a location of a terminal, relative to the BS.

6. The method of claim 2, wherein the relay terminal selection conditions include a condition regarding mobility of a terminal.

7. The method of claim 1, further comprising reporting relay capability of a terminal to the BS before receiving the relay request.

8. The method of claim 1, wherein
   the relaying comprises
   delivering an intention of acceptance of the relay request, to the BS.

9. The method of claim 1, wherein
   the relaying comprises
   when the relay request is not accepted, delivering an intention of rejection or an intention of reserved acceptance of the relay request, to the BS.

10. The method of claim 1, wherein
    the relaying comprises:
    searching for at least one external terminal and establishing a direct link with the at least one external terminal; and
    relaying data between the BS and the at least one external terminal.

11. The method of claim 1, further comprising:
    receiving instruction to hand over the relay role to the relay terminal newly selected by the BS, from the BS; and
    handing over the relay role to the relay terminal.

12. The method of claim 1, further comprising managing a list of at least one external terminal.

13. The method of claim 1, wherein the data comprises information regarding a destination terminal.

14. A data relay method enabling a relay terminal to relay data between a plurality of terminals, the method comprising:
    determining relaying between a first terminal among the plurality of terminals, and other remaining terminals excluding the first terminal among the plurality of terminals;
    relaying data between the first terminal and the other remaining terminals;

after a new terminal establishes a direct link with the first terminal, receiving, by the first terminal, a handover instruction with respect to relay transmitted from the first terminal; and handing over the relay role to the new terminal.

15. The method of claim 14, wherein the determining comprises receiving a relay request with respect to data from the first terminal.

16. The method of claim 14, wherein the determining comprises receiving a relay request with respect to data from a second terminal among the remaining terminals.

17. The method of claim 14, further comprising:

requesting the first terminal to hand over the relay role; and handing over, by the first terminal, the relay role to the selected new terminal.

\* \* \* \* \*